United States Patent [19]
Chandross et al.

[11] Patent Number: 5,243,674
[45] Date of Patent: Sep. 7, 1993

[54] METHOD OF MAKING AN OPTICAL FIBER COMMUNICATION SYSTEM

[75] Inventors: Edwin A. Chandross, Murray Hill; John T. Krause, New Providence, both of N.J.

[73] Assignee: AT&T Bell Laboratories, Murray Hill, N.J.

[21] Appl. No.: 936,685

[22] Filed: Aug. 27, 1992

[51] Int. Cl.$^5$ .................................................. G02B 6/38
[52] U.S. Cl. .......................................... 385/96; 385/97
[58] Field of Search ....................... 385/95, 96, 97, 98, 385/99, 130

[56] References Cited

U.S. PATENT DOCUMENTS

| | | | |
|---|---|---|---|
| 4,957,343 | 9/1990 | Sato et al. | 385/96 |
| 5,018,824 | 5/1991 | Ooe et al. | 385/96 |
| 5,026,135 | 6/1991 | Booth | 385/130 |

OTHER PUBLICATIONS

"Optical Fiber Splices and Connectors", by C. M. Miller, M. Dekker, Inc., pp. 282–293, 1986.

Primary Examiner—John D. Lee
Assistant Examiner—Phan Thi Heartney
Attorney, Agent, or Firm—Eugen E. Pacher

[57] ABSTRACT

Fusion splicing of optical fiber generally requires removal of a polymer coating from the end portions of two lengths of fiber. A conventional removal method involves immersion of the fiber ends in an appropriate polymer stripping liquid, e.g., in hot, concentrated sulfuric acid. It is known that the strength of fusion splices generally is statistically distributed, such that there exists a probability that a given splice will pass at a given proof test level. We have found that the splice strength distribution can be shifted towards higher strength if the polymer stripping liquid comprises means for insuring that the liquid is essentially free of strength-reducing particles. Preferred means are concentrated nitric acid. Exemplarily, the liquid is at a temperature in the range 170°–200° C. and comprises concentrated (about 95%) sulfuric acid and about 5% b.v. concentrated (about 70%) nitric acid.

4 Claims, 1 Drawing Sheet

METHOD OF MAKING AN OPTICAL FIBER COMMUNICATION SYSTEM

FIELD OF THE INVENTION

This invention pertains to methods of making an optical fiber communication system. More particularly, it pertains to methods of signal-transmissively joining two lengths of optical fiber.

BACKGROUND OF THE INVENTION

In order to be able to make a typical optical fiber communication system, it is necessary to be able to abuttingly join two optical fibers such that optical signals can pass from one fiber to the other with, desirably, only small loss. A well known technique for so joining two lengths of optical fiber is fusion splicing. See, for instance, C. M. Miller, "Optical Fiber Splices and Connectors", M. Dekker, Inc., 1986 especially pp. 282-293.

It is not only highly desirable that such fiber splices not introduce significant loss into the optical transmission path, but also that the splices have high mechanical strength. These requirements are particularly severe for, e.g., submarine optical fiber communication systems. Exemplarily, some systems require that splices pass a 200 ksi ($13.8 \times 10^8$ N/m$^2$) tensile test, and some undersea systems require a 300 ksi ($20.7 \times 10^8$ N/m$^2$) proof test.

As is well known, optical fiber conventionally comprises a polymer coating. This coating has to be removed from the relevant end portions of the fibers that are to be joined by fusion splicing. This is conventionally accomplished by dipping in hot (e.g., 180°-200° C.) concentrated sulfuric acid, whereby the coating is etched away. See, for instance, C. M. Miller, op. cit., page 292. Subsequent to fusion splicing the bare fiber portion typically is re-coated. By "etching" of the polymer coating we mean a chemical removal process that can result in a relatively sharp boundary of the remaining polymer, and does not damage the fiber. This is to be contrasted with a removal process, (e.g., one involving a swelling process) which does not result in a sharp boundary.

It has been observed that typically only a relatively small fraction (frequently <50%) of prior art fusion splices can pass the 300 ksi strength test, frequently requiring re-splicing. This is obviously costly and thus undesirable. It will be understood that associated with a batch of fusion spliced optical fibers is a strength distribution, with a certain percentage of the fibers passing at a given proof test level.

In view of the importance of increasing the fraction of fusion splices that passes an appropriate strength test, a method of splicing optical fiber that can yield splices of improved strength would be desirable. This application discloses such a method.

THE INVENTION

Figure 1:
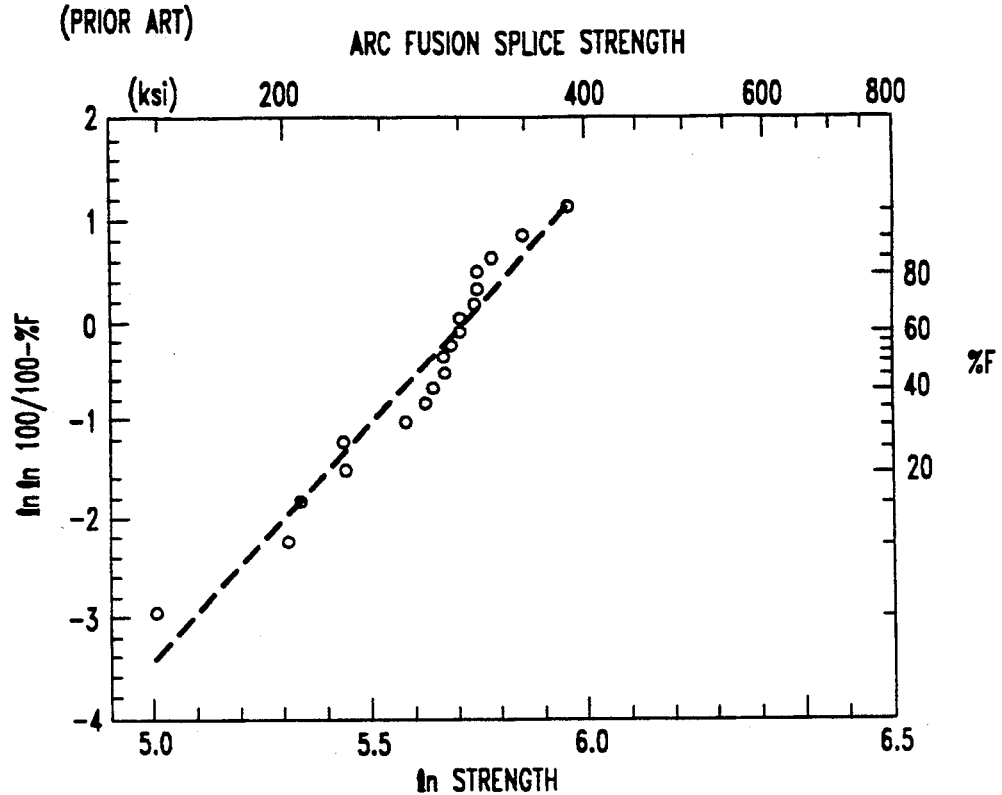
FIGS. 1 and 2 give exemplary data on the strength of prior art splices and splices made according to the invention.

The invention is based on our discovery that the presence of particles in the liquid that is used to remove the polymer coating of the fibers is frequently correlated with relatively low splice strength.

Generally speaking, the invention is an improved method of making an optical fiber communication system that comprises an end-to-end fusion splice between two lengths of optical fiber. More particularly, the invention is embodied in an improved method of fusion splicing of optical fiber than can result in a significantly greater percentage of fiber splices passing a given proof test level than prior art splices.

The method of making the optical fiber communication system typically comprises providing two lengths of polymer-coated optical fiber, etching the polymer coating from an end portion of each of the two lengths of optical fiber, joining the two lengths by abuttingly fusing the polymer-free ends, and coating the polymer-free portion of the joined fibers. Etching the polymer coating comprises contacting the respective end portions with a liquid that attacks the polymer, in a controllable fashion without damaging the fiber. Exemplary of such a liquid is concentrated (about 95%) sulfuric acid. Significantly, the liquid also comprises means for insuring that the liquid is, during the etching step, essentially free of particles that are effective in reducing the strength of the resulting fusion splice, exemplarily particles who can adhere to the fiber surface and interact with the fiber. Such particles will be referred to as "strength-reducing" particles. In a currently preferred embodiment the liquid comprises concentrated sulfuric acid and nitric acid, typically at a temperature in the range 170°-200° C.

It is known that concentrated sulfuric acid is a moderate oxidizing agent whose potency depends on temperature. It is also known to be a powerful dehydrating agent and can readily carbonize a variety of organic materials, including polymers of the type used for optical fiber coatings (e.g., aliphatic acrylate-based polymers).

In an exemplary embodiment of the invention the percentage of fiber splices that pass a 200 ksi proof test exceeds by at least 5%, preferably at least 10%, the percentage of, otherwise identically prepared, prior art splices. Equivalently, the probability that a splice according to the invention passes a 200 ksi proof test is at least 5%, preferably at least 10% greater than the probability that an, otherwise identical, prior art splice passes that test. Those skilled in the art will appreciate that statements about splice strength are inherently statistical in nature, requiring consideration of a sample of splices. Typically such a sample will contain more than 10, preferably more than 20 splices.

We have observed that the prior art hot sulfuric acid used to etch polymer coatings typically turns orange-brown after just a few etching operations, and have observed a correlation between increasing color and decreasing splice strength. This typically requires replacement of the sulfuric acid after a relatively few etching operations. We currently believe that the observed color change is due to an accumulation of colloidal particles, most likely carbonaceous particles, in the liquid. Addition of concentrated (about 70%) nitric acid (typically 2-10% by volume, e.g., about 5%) can prevent or at least substantially delay the color change. We currently believe that the nitric acid serves to substantially completely oxidize the polymer, exemplarily to CO or $CO_2$, thus avoiding formation of carbonaceous particles. Thus, at least in principle, any other compatible strong oxidizing agent (e.g., perchloric acid) that can completely oxidize the polymer could be used instead of nitric acid. Nitrate salts could in principle be used but are not preferred because it is desirable to keep the fiber surface free of metal ions. Nitric acid is the currently preferred additive, offering the advantages of effectiveness, convenience and safety, in addition to low cost, as compared to other, more powerful oxidants.

The presence of strength-reducing particles of any kind in the coating-removing liquid being potentially detrimental to fiber strength, it is desirable to insure the absence of such particles in the virgin liquid, as well as to prevent contamination of the liquid with such particles. The former indicates use of commercially available "low particulate" reagents, and the latter indicates provision of a substantially particle-free environment.

Subsequent to polymer removal, the bare fibers advantageously are rinsed in a "particle-free" organic solvent such as methanol to remove residual acid. Solvents that do not attack the remaining polymer are preferred. Alternatively, rinsing in "particle-free" pure water is possible.

Figure 2:
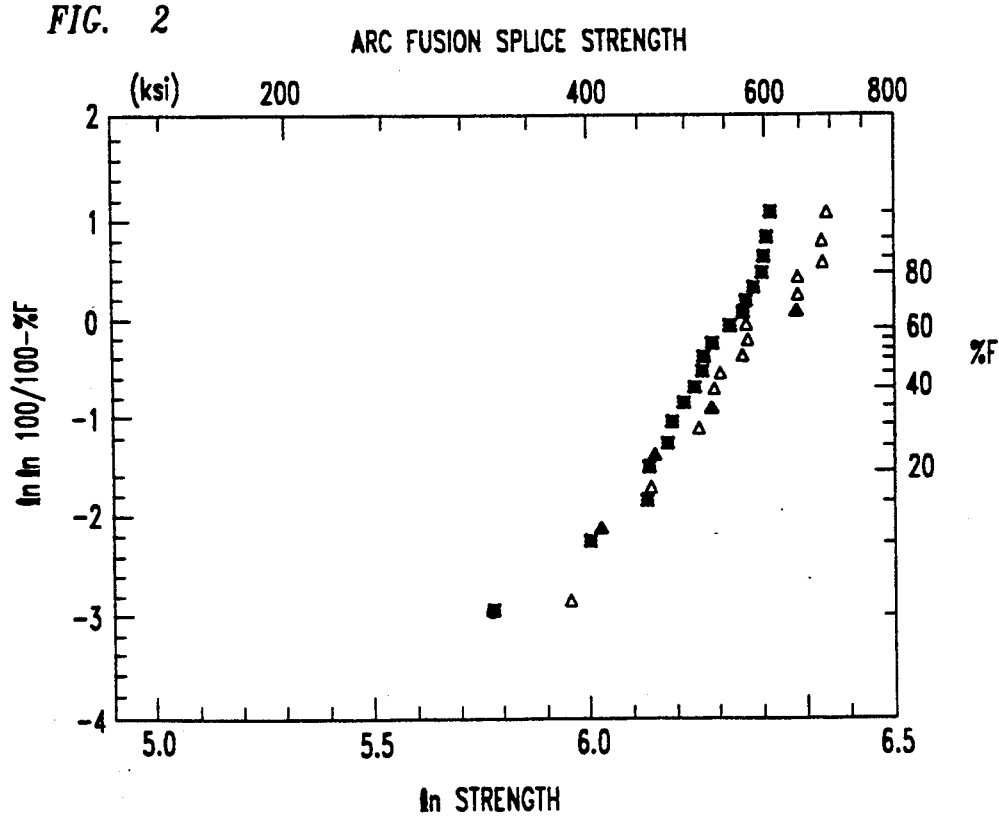

FIG. 1 shows data on arc fusion splice strength for fiber whose polymer was etched away in prior art hot sulfuric acid. FIG. 2 shows analogous data for identical fiber whose polymer was etched away in 185° C. sulfuric and (5% by volume) nitric acid according to the invention, followed by a water rinse. The improvement is clear and striking, with the percentage of splices according to the invention that pass the 200 ksi proof test exceeding the corresponding percentage of prior art splices by more than 10%. The data are presented in form of conventional Weibull plots.

An optical fiber communication system according to the invention comprises, in addition to at least two lengths of optical fiber that are spliced in accordance with the invention, typically also such conventional means as optical signal generating means, means for coupling the signal into the optical fiber, means for regenerating or amplifying the optical signal, and signal detection means. The optical fiber typically is single mode silica-based fiber. Such fiber is well known.

We claim:

1. Method of making an optical fiber communication system that comprises
    a) providing two lengths of polymer-coated optical fibers;
    b) removing the polymer coating from an end portion of each of the two lengths of optical fiber by a process that comprises contacting the respective end portions with a liquid that comprises an agent adapted for etching away said polymer coating;
    c) splicing said two lengths of optical fiber by abuttingly fusing the polymer-free ends; and
    d) re-coating the polymer-free portion of the joined fibers;
    characterized in that the liquid further comprises
    e) means for insuring that, during step b), the liquid is essentially free of strength-reducing particles.

2. Method of claim 1, wherein said agent is concentrated sulfuric acid, and wherein the means of e) comprise concentrated nitric acid.

3. Method of claim 2, wherein the liquid comprises between 2 and 10 volume % concentrated nitric acid, and wherein the liquid has a temperature in the range 170°–200° C.

4. Method of claim 1, wherein associated with the splice is a probability that the splice passes a 200 ksi proof test, the liquid selected such that said probability exceeds by at least 5% the probability that an otherwise identical comparison splice passes said proof test, the comparison splice differing from said splice only in that its polymer coating is etched in a liquid that does not comprise the means of e).

* * * * *